(12) United States Patent
Allo et al.

(10) Patent No.: US 10,222,116 B2
(45) Date of Patent: Mar. 5, 2019

(54) METHOD AND APPARATUS FOR FORMING A VACUUM INSULATED STRUCTURE FOR AN APPLIANCE HAVING A PRESSING MECHANISM INCORPORATED WITHIN AN INSULATION DELIVERY SYSTEM

(71) Applicant: Whirlpool Corporation, Benton Harbor, MI (US)

(72) Inventors: Berhanu Allo, Newburgh, IN (US); Mohamed Alshourbagy, Stevensville, MI (US); Jon M. Anthony, Evansville, IN (US); Lakshya J. Deka, Mishawaka, IN (US); Abhay Naik, Stevensville, MI (US); Lorraine J. Westlake, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/961,945

(22) Filed: Dec. 8, 2015

(65) Prior Publication Data

US 2017/0159997 A1 Jun. 8, 2017

(51) Int. Cl.
*F25D 23/06* (2006.01)
*B29K 105/00* (2006.01)

(52) U.S. Cl.
CPC ...... *F25D 23/062* (2013.01); *B29K 2105/251* (2013.01); *B29K 2995/0015* (2013.01); *F25D 2201/14* (2013.01); *Y02B 40/34* (2013.01)

(58) Field of Classification Search
CPC .............. F25D 23/065; F25D 2201/14; B29K 2995/0015; B29K 2105/251; Y02B 40/34

(Continued)

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

(Continued)

*Primary Examiner* — Jason K Niesz
*Assistant Examiner* — James Hakomaki
(74) *Attorney, Agent, or Firm* — Price Heneveld LLP

(57) ABSTRACT

An insulation delivery apparatus for forming an insulated appliance structure includes an insulated structure having a wrapper and a liner that define an interior cavity and a hopper having a storage bin and a delivery mechanism. The delivery mechanism delivers an insulating medium from the storage bin, through an insulation conduit and into the interior cavity. The delivery mechanism operates between idle and delivery states. A pressing mechanism is coupled with the insulation conduit and is in selective engagement with the insulated structure. The pressing mechanism operates between rest and compressing states. An inner support is in selective engagement with an outer surface of the inner liner and an operable outer support in selective engagement with the outer wrapper. The inner support and the operable outer support provide structural support to the insulated structure when the pressing mechanism is in the compressing state.

20 Claims, 7 Drawing Sheets

(58) Field of Classification Search
USPC .................................... 141/12, 59; 100/215
See application file for complete search history.

(56) References Cited

U.S. PATENT DOCUMENTS

| | | | |
|---|---|---|---|
| 1,849,369 A | 3/1932 | Frost | |
| 1,921,576 A | 8/1933 | Muffly | |
| 2,108,212 A | 2/1938 | Schellens | |
| 2,128,336 A | 8/1938 | Torstensson | |
| 2,164,143 A | 6/1939 | Munters | |
| 2,191,659 A | 2/1940 | Hintze | |
| 2,318,744 A | 5/1943 | Brown | |
| 2,356,827 A | 8/1944 | Coss et al. | |
| 2,381,454 A * | 8/1945 | Huth | B65B 1/26 128/203.15 |
| 2,432,042 A | 12/1947 | Richard | |
| 2,439,602 A | 4/1948 | Heritage | |
| 2,439,603 A | 4/1948 | Heritage | |
| 2,451,884 A | 10/1948 | Stelzer | |
| 2,538,780 A | 1/1951 | Hazard | |
| 2,559,356 A | 7/1951 | Hedges | |
| 2,729,863 A | 1/1956 | Kurtz | |
| 2,768,046 A | 10/1956 | Evans | |
| 2,817,123 A | 12/1957 | Jacobs | |
| 2,942,438 A | 6/1960 | Schmeling | |
| 2,985,075 A | 5/1961 | Knutsson-Hall | |
| 3,086,830 A | 4/1963 | Malia | |
| 3,125,388 A | 3/1964 | Constantini et al. | |
| 3,137,900 A | 6/1964 | Carbary | |
| 3,218,111 A | 11/1965 | Steiner | |
| 3,258,883 A | 7/1966 | Campanaro et al. | |
| 3,290,893 A | 12/1966 | Haldopoulos | |
| 3,338,451 A | 8/1967 | Kesling | |
| 3,353,301 A | 11/1967 | Heilweil et al. | |
| 3,353,321 A | 11/1967 | Heilweil et al. | |
| 3,358,059 A | 12/1967 | Snyder | |
| 3,379,481 A | 4/1968 | Fisher | |
| 3,408,316 A | 10/1968 | Mueller et al. | |
| 3,471,416 A | 10/1969 | Fijal | |
| 3,597,850 A | 8/1971 | Jenkins | |
| 3,632,012 A | 1/1972 | Kitson | |
| 3,633,783 A | 1/1972 | Aue | |
| 3,634,971 A | 1/1972 | Kesling | |
| 3,635,536 A | 1/1972 | Lackey et al. | |
| 3,670,521 A | 6/1972 | Dodge, III et al. | |
| 3,688,384 A | 9/1972 | Mizushima et al. | |
| 3,862,880 A | 1/1975 | Feldman | |
| 3,868,829 A | 3/1975 | Mann et al. | |
| 3,875,683 A | 4/1975 | Waters | |
| 3,935,787 A | 2/1976 | Fisher | |
| 4,005,919 A | 2/1977 | Hoge et al. | |
| 4,006,947 A | 2/1977 | Haag et al. | |
| 4,043,624 A | 8/1977 | Lindenschmidt | |
| 4,050,145 A | 9/1977 | Benford | |
| 4,067,628 A | 1/1978 | Sherburn | |
| 4,170,391 A | 10/1979 | Bottger | |
| 4,242,241 A | 12/1980 | Rosen et al. | |
| 4,260,876 A | 4/1981 | Hochheiser | |
| 4,303,730 A | 12/1981 | Torobin | |
| 4,303,732 A | 12/1981 | Torobin | |
| 4,325,734 A | 4/1982 | Burrage et al. | |
| 4,330,310 A | 5/1982 | Tate, Jr. et al. | |
| 4,332,429 A | 6/1982 | Frick et al. | |
| 4,396,362 A | 8/1983 | Thompson et al. | |
| 4,417,382 A | 11/1983 | Schilf | |
| 4,492,368 A | 1/1985 | DeLeeuw et al. | |
| 4,529,368 A | 7/1985 | Makansi | |
| 4,548,196 A | 10/1985 | Torobin | |
| 4,660,271 A | 4/1987 | Lenhardt | |
| 4,671,909 A | 6/1987 | Torobin | |
| 4,671,985 A | 6/1987 | Rodrigues et al. | |
| 4,681,788 A | 7/1987 | Barito et al. | |
| 4,745,015 A | 5/1988 | Cheng et al. | |
| 4,777,154 A | 10/1988 | Torobin | |
| 4,781,968 A | 11/1988 | Kellerman | |
| 4,805,293 A | 2/1989 | Buchser | |
| 4,865,875 A | 9/1989 | Kellerman | |
| 4,870,735 A | 10/1989 | Jahr et al. | |
| 4,914,341 A | 4/1990 | Weaver et al. | |
| 4,917,841 A | 4/1990 | Jenkins | |
| 5,007,226 A | 4/1991 | Nelson | |
| 5,018,328 A | 5/1991 | Cur et al. | |
| 5,033,636 A | 7/1991 | Jenkins | |
| 5,066,437 A | 11/1991 | Barito et al. | |
| 5,082,335 A | 1/1992 | Cur et al. | |
| 5,084,320 A | 1/1992 | Barito et al. | |
| 5,094,899 A | 3/1992 | Rusek, Jr. | |
| 5,118,174 A | 6/1992 | Benford et al. | |
| 5,121,593 A | 6/1992 | Forslund | |
| 5,157,893 A | 10/1992 | Benson et al. | |
| 5,168,674 A | 12/1992 | Molthen | |
| 5,171,346 A | 12/1992 | Hallett | |
| 5,175,975 A | 1/1993 | Benson et al. | |
| 5,212,143 A | 5/1993 | Torobin | |
| 5,221,136 A | 6/1993 | Hauck et al. | |
| 5,227,245 A | 7/1993 | Brands et al. | |
| 5,231,811 A | 8/1993 | Andrepont et al. | |
| 5,248,196 A | 9/1993 | Lynn et al. | |
| 5,251,455 A | 10/1993 | Cur et al. | |
| 5,252,408 A | 10/1993 | Bridges et al. | |
| 5,263,773 A | 11/1993 | Gable et al. | |
| 5,273,801 A | 12/1993 | Barry et al. | |
| 5,318,108 A | 6/1994 | Benson et al. | |
| 5,340,208 A | 8/1994 | Hauck et al. | |
| 5,353,868 A | 10/1994 | Abbott | |
| 5,359,795 A | 11/1994 | Mawby et al. | |
| 5,375,428 A | 12/1994 | LeClear et al. | |
| 5,397,759 A | 3/1995 | Torobin | |
| 5,418,055 A | 5/1995 | Chen et al. | |
| 5,433,056 A | 7/1995 | Benson et al. | |
| 5,477,676 A | 12/1995 | Benson et al. | |
| 5,500,305 A | 3/1996 | Bridges et al. | |
| 5,505,810 A | 4/1996 | Kirby et al. | |
| 5,507,999 A | 4/1996 | Copsey et al. | |
| 5,509,248 A | 4/1996 | Dellby et al. | |
| 5,512,345 A | 4/1996 | Tsutsumi et al. | |
| 5,532,034 A | 7/1996 | Kirby et al. | |
| 5,533,311 A | 7/1996 | Tirrell et al. | |
| 5,562,154 A | 10/1996 | Benson et al. | |
| 5,586,680 A | 12/1996 | Dellby et al. | |
| 5,599,081 A | 2/1997 | Revlett et al. | |
| 5,600,966 A | 2/1997 | Valence et al. | |
| 5,632,543 A | 5/1997 | McGrath et al. | |
| 5,640,828 A | 6/1997 | Reeves et al. | |
| 5,643,485 A | 7/1997 | Potter et al. | |
| 5,652,039 A | 7/1997 | Tremain et al. | |
| 5,716,581 A | 2/1998 | Tirrell et al. | |
| 5,768,837 A | 6/1998 | Sjoholm | |
| 5,792,801 A | 8/1998 | Tsuda et al. | |
| 5,813,454 A | 9/1998 | Potter | |
| 5,827,385 A | 10/1998 | Meyer et al. | |
| 5,834,126 A | 11/1998 | Sheu | |
| 5,843,353 A | 12/1998 | DeVos et al. | |
| 5,866,228 A | 2/1999 | Awata | |
| 5,866,247 A | 2/1999 | Klatt et al. | |
| 5,868,890 A | 2/1999 | Fredrick | |
| 5,900,299 A | 5/1999 | Wynne | |
| 5,924,295 A | 7/1999 | Park | |
| 5,952,404 A | 9/1999 | Simpson et al. | |
| 5,966,963 A | 10/1999 | Kovalaske | |
| 5,985,189 A | 11/1999 | Lynn et al. | |
| 6,013,700 A | 1/2000 | Asano et al. | |
| 6,063,471 A | 5/2000 | Dietrich et al. | |
| 6,094,922 A | 8/2000 | Ziegler | |
| 6,109,712 A | 8/2000 | Haworth et al. | |
| 6,128,914 A | 10/2000 | Tamaoki et al. | |
| 6,132,837 A | 10/2000 | Boes et al. | |
| 6,158,233 A | 12/2000 | Cohen et al. | |
| 6,163,976 A | 12/2000 | Tada et al. | |
| 6,164,030 A | 12/2000 | Dietrich | |
| 6,164,739 A | 12/2000 | Schulz et al. | |
| 6,187,256 B1 | 2/2001 | Aslan et al. | |
| 6,209,342 B1 | 4/2001 | Banicevic et al. | |
| 6,210,625 B1 | 4/2001 | Matsushita et al. | |

(56) References Cited

U.S. PATENT DOCUMENTS

| | | |
|---|---|---|
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,703,217 B2 | 4/2010 | Tada et al. |
| 7,703,824 B2 | 4/2010 | Kittelson et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,491,070 B2 | 7/2013 | Davis et al. |
| 8,522,563 B2 | 9/2013 | Allard et al. |
| 8,528,284 B2 | 9/2013 | Aspenson et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,870,034 B2 * | 10/2014 | Suzuki .............. B05B 9/047 222/386 |
| 8,871,323 B2 | 10/2014 | Kim et al. |
| 8,881,398 B2 | 10/2014 | Hanley et al. |
| 8,899,068 B2 | 12/2014 | Jung et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,038,403 B2 | 5/2015 | Cur et al. |
| 9,056,952 B2 | 6/2015 | Eilbracht et al. |
| 9,071,907 B2 | 6/2015 | Kuehl et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,140,480 B2 | 9/2015 | Kuehl et al. |
| 9,140,481 B2 | 9/2015 | Curr et al. |
| 9,170,045 B2 | 10/2015 | Oh et al. |
| 9,170,046 B2 | 10/2015 | Jung et al. |
| 9,182,158 B2 | 11/2015 | Wu |
| 9,188,382 B2 | 11/2015 | Kim et al. |
| 9,221,210 B2 | 12/2015 | Wu et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,791,204 B2 | 10/2017 | Kim et al. |
| 9,833,942 B2 | 12/2017 | Wu et al. |

(56) References Cited

U.S. PATENT DOCUMENTS

| | | |
|---|---|---|
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0054024 A1* | 3/2008 | Kubota .............. B65D 83/0044 222/386.5 |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0324871 A1 | 12/2009 | Henn |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0273111 A1 | 11/2012 | Nomura et al. |
| 2012/0279247 A1 | 11/2012 | Katu et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0305535 A1 | 11/2013 | Cur et al. |
| 2013/0328472 A1 | 12/2013 | Shim et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0178267 A1 | 6/2016 | Hao et al. |
| 2016/0178269 A1 | 6/2016 | Hiemeyer et al. |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |

(56) References Cited

FOREIGN PATENT DOCUMENTS

| | | |
|---|---|---|
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 | 8/2006 |
| EP | 1484563 | 10/2008 |
| EP | 2342511 | 8/2012 |
| EP | 2607073 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 03013779 | 1/1991 |
| JP | 404165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07167377 | 7/1995 |
| JP | 08300052 | 11/1996 |
| JP | H08303686 | 11/1996 |
| JP | H09166271 | 6/1997 |
| JP | 10113983 | 5/1998 |
| JP | 11159693 | 6/1999 |
| JP | 11311395 | 11/1999 |
| JP | 11336990 | 12/1999 |
| JP | 2000097390 | 4/2000 |
| JP | 2000117334 | 4/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 03478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161834 | 6/2006 |
| JP | 2006161945 | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2234645 C1 | 8/2004 |
| RU | 2252377 | 5/2005 |
| RU | 2349618 C2 | 3/2009 |
| RU | 2414288 C2 | 3/2011 |
| RU | 2422598 | 6/2011 |
| RU | 142892 | 7/2014 |
| RU | 2571031 | 12/2015 |
| SU | 203707 | 12/1967 |
| SU | 00476407 A1 | 7/1975 |
| SU | 476407 | 11/1975 |
| SU | 648780 A1 | 2/1979 |
| SU | 01307186 A1 | 4/1987 |
| WO | 9614207 A1 | 5/1996 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |

(56) References Cited

FOREIGN PATENT DOCUMENTS

| | | |
|---|---|---|
| WO | 2009112433 A1 | 9/2009 |
| WO | 2009147106 | 12/2009 |
| WO | 2010007783 | 1/2010 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

Kitchen Aid, "Refrigerator User Instructions," 120 pages, published Sep. 5, 2015.

Cai et al., "Generation of Metal Nanoparticles by Laser Ablation of Microspheres," J. Aerosol Sci., vol. 29, No. 5/6 (1998), pp. 627-636.

Raszewski et al., "Methods for Producing Hollow Glass Microspheres," Powerpoint, cached from Google, Jul. 2009, 6 pages.

\* cited by examiner

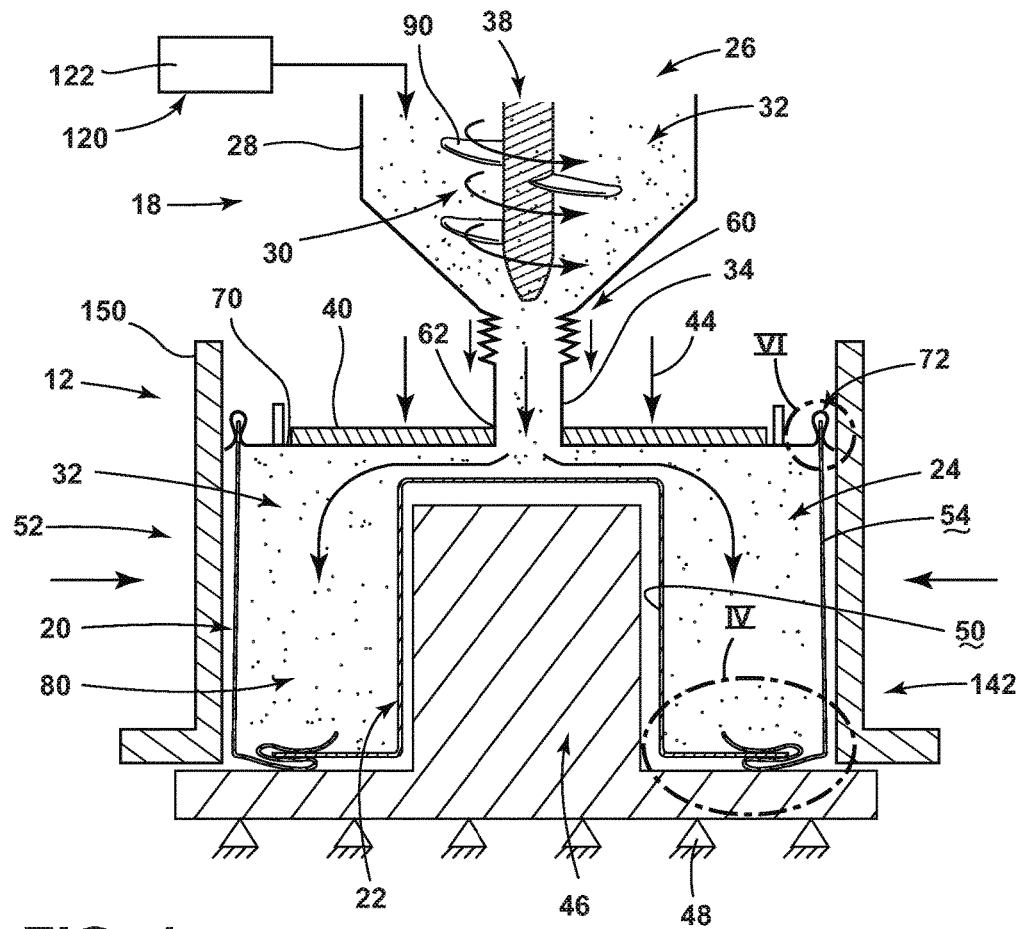
FIG. 4
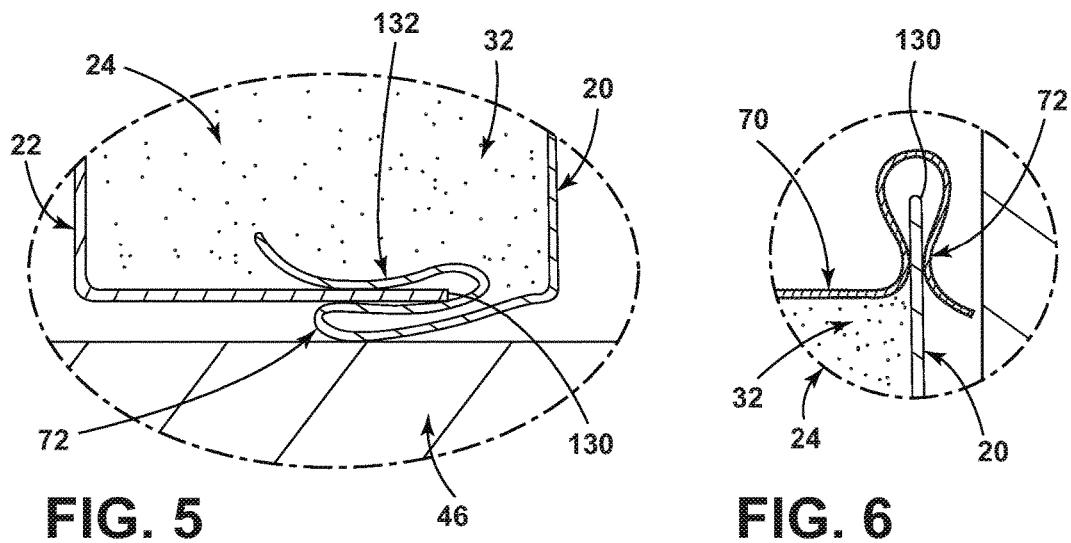
FIG. 5
FIG. 6

METHOD AND APPARATUS FOR FORMING A VACUUM INSULATED STRUCTURE FOR AN APPLIANCE HAVING A PRESSING MECHANISM INCORPORATED WITHIN AN INSULATION DELIVERY SYSTEM

BACKGROUND

The device is in the field of mechanisms for forming vacuum insulated structures. Specifically, the device includes a pressing mechanism incorporated within an insulation delivery system for simultaneously delivering and pressing insulative material.

SUMMARY

In at least one aspect, an insulation delivery apparatus for forming an insulated appliance structure includes an insulated structure having an outer wrapper and an inner liner that cooperate to define an interior cavity. A hopper has a storage bin and a delivery mechanism, wherein the delivery mechanism selectively delivers an insulating medium from the storage bin, through an insulation conduit and into the interior cavity, wherein the delivery mechanism is operable between an idle state and a delivery state. A pressing mechanism is coupled with the insulation conduit, wherein the pressing mechanism is in selective engagement with the insulated structure, wherein the pressing mechanism is operable between a rest state and a compressing state. An inner support is in selective engagement with an outer surface of the inner liner and an operable outer support in selective engagement with a portion of an exterior surface of the outer wrapper, wherein the inner support and the operable outer support provides structural support to the insulated structure when the pressing mechanism is in the compressing state.

In at least another aspect, a method for forming a vacuum insulated structure includes disposing an insulation material into a hopper having a storage bin and a delivery mechanism, wherein a pressing mechanism is in communication with the hopper. An insulated structure is positioned on an inner support, wherein the insulated structure includes an inner liner and an outer wrapper that define an insulating cavity. Portions of an operable outer support are positioned against an exterior surface of the insulated structure, wherein the inner support and the operable outer support locate the insulated structure such that the delivery mechanism is in communication with the insulating cavity. The delivery mechanism is operated to dispose the insulation material within the insulating cavity of the insulated structure. The pressing mechanism is operated during operation of the delivery mechanism to compress the insulation material disposed within the insulating cavity to define a target density, wherein a back panel of the insulated structure is engaged with the pressing mechanism. The inner support and the operable outer support substantially limit outward deflection of the outer wrapper and inner liner during operation of the pressing mechanism. The back panel is sealed to the remainder of the insulated structure to define a hermetic seal. Gas is expressed from the interior cavity to define a vacuum insulated structure and portions of the operable outer support are moved away from the vacuum insulated structure. The vacuum insulated structure is removed from the inner support.

In at least another aspect, a method for forming a vacuum insulated structure includes disposing an insulation material into a hopper having a storage bin and a delivery mechanism, wherein a pressing mechanism is in communication with the hopper. An insulated structure is positioned proximate an operable outer support, wherein the insulated structure includes an insulating cavity. Portions of the operable outer support are positioned against an exterior surface of the insulated structure, wherein the operable outer support locates the insulated structure such that the delivery mechanism is in communication with the insulating cavity. The delivery mechanism is operated to dispose the insulation material within the insulating cavity of the insulated structure and the pressing mechanism is operated during operation of the delivery mechanism to compress the insulation material disposed within the insulating cavity to define a target density. The operable outer support substantially limits outward deflection of the outer wrapper and inner liner during operation of the pressing mechanism. The insulated structure is sealed with the insulating material disposed therein to define a hermetic seal and gas is expressed from the interior cavity to define a vacuum insulated structure. The portions of the operable outer support are moved away from the vacuum insulated structure.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 4 is a cross-sectional view of the insulation delivery apparatus during delivery of the insulating material and pressing of the insulating material within the interior cavity of the insulated structure;

FIG. 5 is an enlarged cross-sectional view of the insulation delivery apparatus of FIG. 4 taken at area V;

FIG. 6 is an enlarged cross-sectional view of the insulation delivery apparatus of FIG. 4 taken at area VI;

DETAILED DESCRIPTION OF EMBODIMENTS

Figure 1:
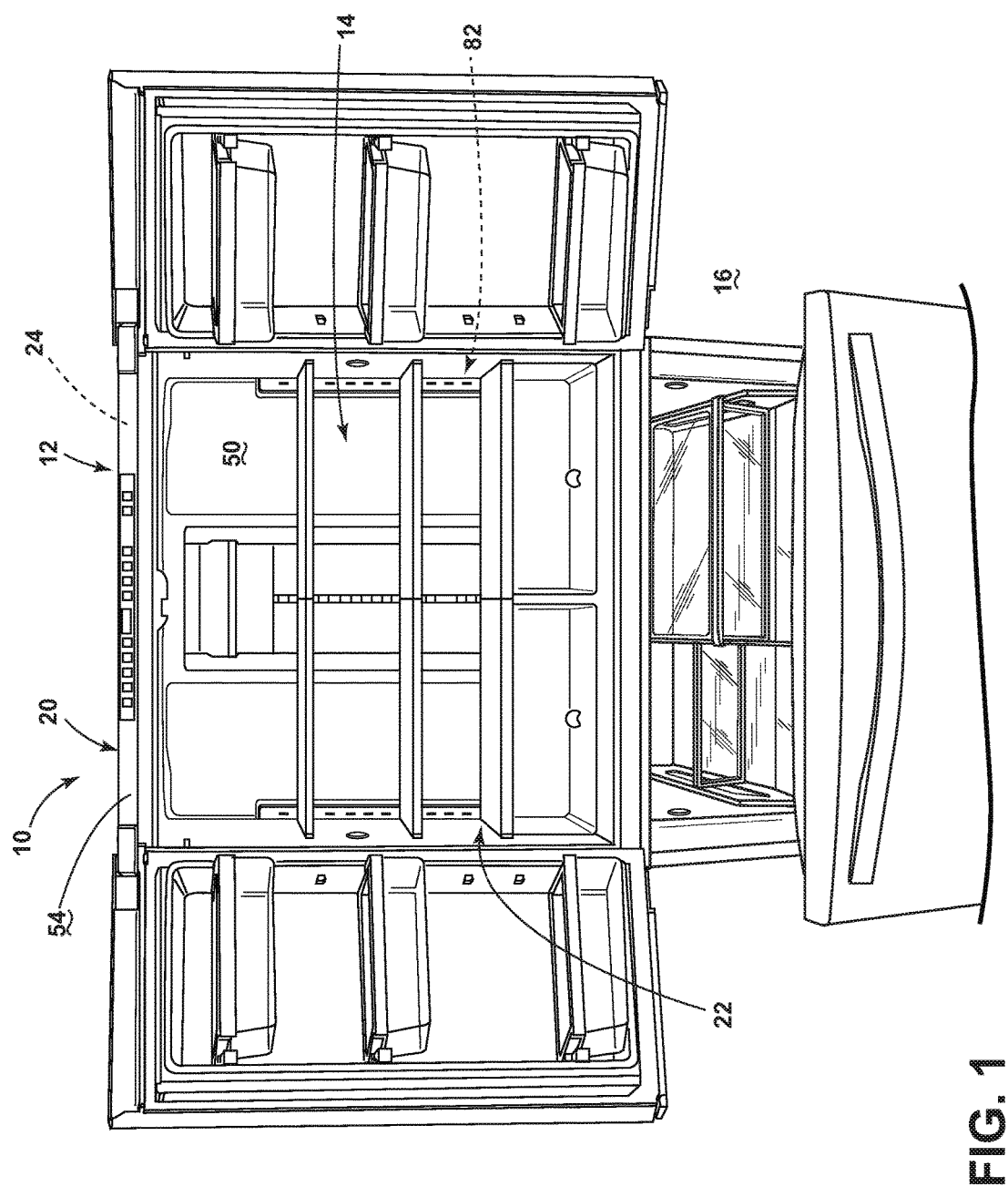
FIG. 1 is a front perspective view of an appliance incorporating a vacuum insulated structure formed by an aspect of the insulation delivery apparatus.
Figure 2:
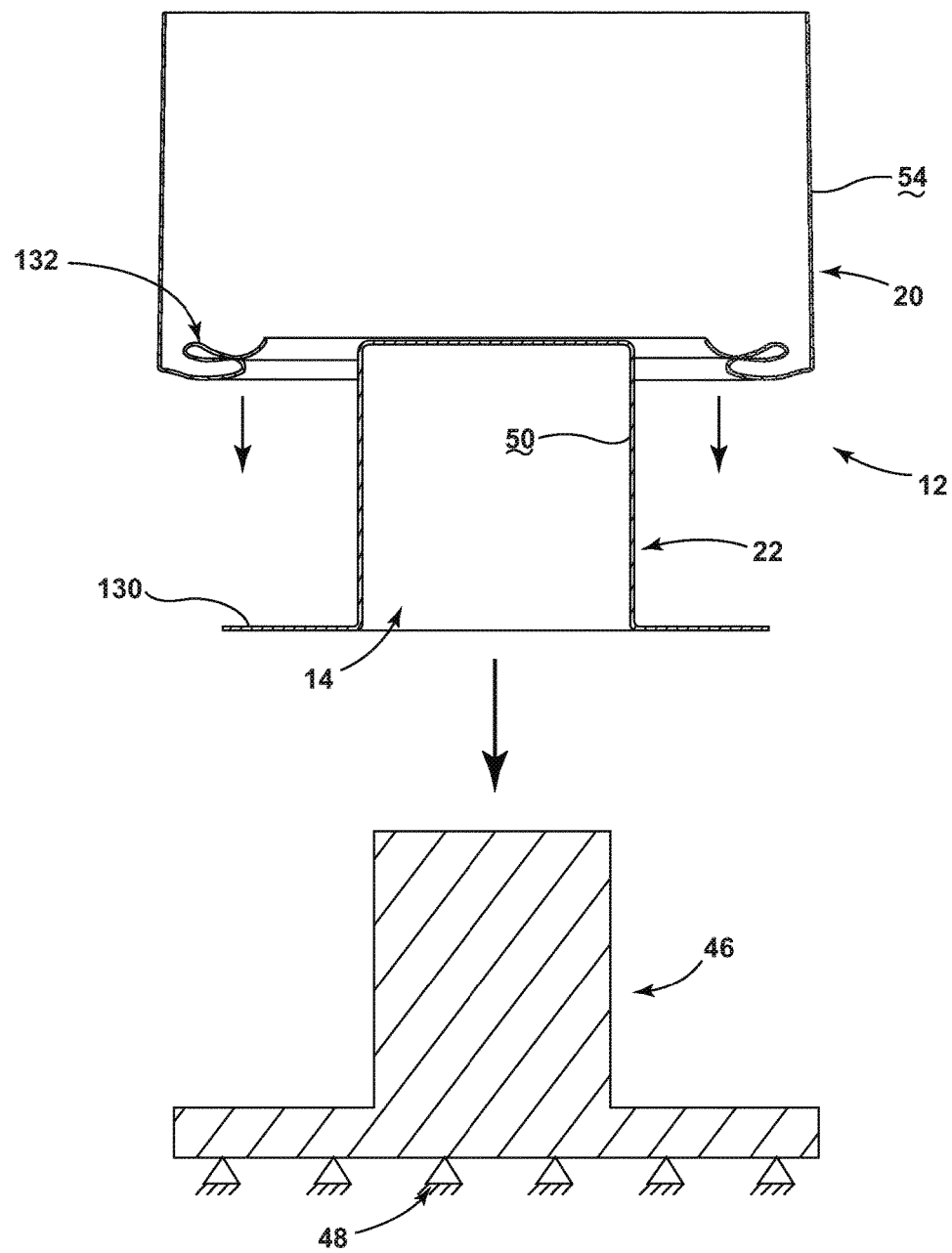
FIG. 2 is a partially exploded view of an aspect of the insulated structure and an inner support for the insulation delivery apparatus.
Figure 3:
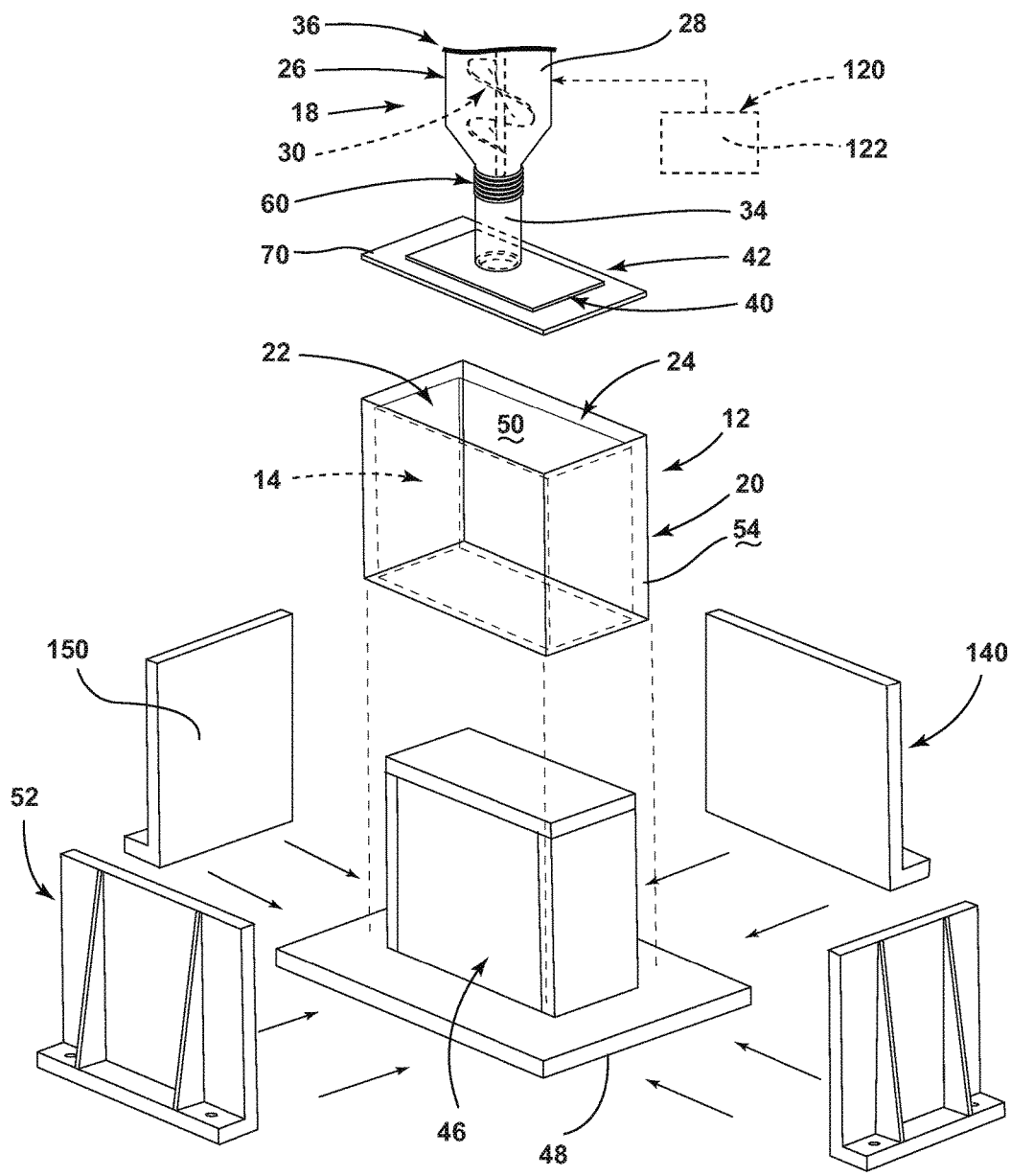
FIG. 3 is an exploded perspective view of components of an aspect of the insulation delivery apparatus.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-7, reference numeral 10 generally refers to an appliance that includes a vacuum-type and/or compressed insulated structure 12 disposed therein for substantially limiting thermal transfer from an internal compartment 14 of the appliance 10 to external areas 16 of the appliance 10. According to various aspects of the device, an appliance 10 can include an insulated structure 12 formed using an insulation delivery apparatus 18. The insulated structure 12 for the appliance 10 can include an outer wrapper 20 and an inner liner 22 that cooperate to define an interior cavity 24. The insulation delivery apparatus 18 can include a hopper 26 having a storage bin 28 and a delivery mechanism 30. The delivery mechanism 30 selectively delivers an insulating medium 32 from the storage bin 28, through an insulation conduit 34, and into the interior cavity 24. It is contemplated that the delivery mechanism 30 is operable between an idle state 36 and a delivery state 38, the idle state 36 being defined by the delivery mechanism 30 being substantially deactivated and the movement of the insulating medium 32 from the storage bin 28 and into the interior cavity 24 diminished or fully stopped. The delivery state 38 of the delivery mechanism 30 is defined by the operation of the delivery mechanism 30 for transporting the insulating medium 32 from the storage bin 28 and into the interior cavity 24 of the insulated structure 12. A pressing mechanism 40 is coupled with the insulation conduit 34 connected with the hopper 26. The pressing mechanism 40 is in selective engagement with the insulated structure 12. In this manner, the pressing mechanism 40 is operable between a rest state 42, where the pressing mechanism 40 is positioned above the insulated structure 12, and a compressing state 44, wherein the pressing mechanism 40 is moved downward toward the insulated structure 12 to engage the interior cavity 24 of the insulated structure 12. In this manner, the pressing mechanism 40 is adapted to compress the insulating medium 32 to be densified within the interior cavity 24 of the insulated structure 12. The insulation delivery apparatus 18 can include an inner support 46 that is attached to a base structure 48, where the inner support 46 selectively engages an outer surface 50 of the inner liner 22. It is contemplated that the inner liner 22 of the insulated structure 12 can be placed over the inner support 46 such that the inner liner 22 and, in turn, the insulated structure 12, can rest upon the inner support 46 to position the insulated structure 12 relative to the insulation delivery apparatus 18. The insulation delivery apparatus 18 also includes an operable outer support 52 that is in selective engagement with a portion of an exterior surface 54 of the outer wrapper 20. It is contemplated that engagement between the operable outer support 52 and the exterior surface 54 of the outer wrapper 20 serves to further secure the insulated structure 12 within the insulation delivery apparatus 18 and relative to the hopper 26. The inner support 46 and the operable outer support 52 also provide structural support and buttressing support to the insulated structure 12 as the pressing mechanism 40 is operated in the compressing state 44.

Referring again to FIGS. 3-6, it is contemplated that the insulation conduit 34 can include an operable portion 60 that is in communication with the pressing mechanism 40. The operable portion 60 is adapted to be at least vertically flexible, displaceable or otherwise operable relative to the storage bin 28. It is further contemplated that the operable portion 60 can be movable in lateral, rotational and other directions in addition to being vertically operable relative to the storage bin 28. The operable portion 60 of the insulation conduit 34 allows for the delivery mechanism 30 to transfer the insulating medium 32 from the storage bin 28, through the insulation conduit 34 and into the interior cavity 24 as the pressing mechanism 40 moves in the compressing state 44. In this manner, at least a portion of the insulation conduit 34, proximate the operable portion 60, can extend through a portion of the pressing mechanism 40. Accordingly, the pressing mechanism 40 can define a conduit aperture 62 through which the operable portion 60 of the insulation conduit 34 can deliver the insulating medium 32 through the pressing mechanism 40 and into the interior cavity 24 of the insulated structure 12. According to the various embodiments, the pressing mechanism 40 can include a shape that corresponds to various shapes of insulated structure 12. In this manner, the pressing mechanism 40 can be shaped to extend into the various walls of the insulated structure 12. The pressing mechanism 40 can also be shaped to correspond to the shape of the back panel 70 of the insulated structure 12. Combinations of these shapes can be used in a pattern to compress the insulating medium 32 at various stages of the operation of the delivery apparatus 18. These various shapes of the pressing mechanism 40 can serve to substantially prevent the insulating medium 32 from sticking or otherwise adhering to the surfaces that define the interior cavity 24.

Referring again to FIGS. 2-7, a back panel 70 for the insulated structure 12 is selectively engaged with the operable portion 60 of the insulation conduit 34. In this manner, the pressing mechanism 40 operates the back panel 70 and the operable portion 60 of the insulation conduit 34 relative to the back panel 70. As the pressing mechanism 40 moves from within the compressing state 44, the pressing mechanism 40 positions the back panel 70 relative to the insulated structure 12 and the interior cavity 24, such that the size of the insulated structure 12 can be set through the operation of the pressing mechanism 40. Once the pressing mechanism 40 places the back panel 70 in the appropriate location relative to the insulated structure 12, a sealing apparatus (not shown) of the insulation delivery apparatus 18 can be selectively operated to form a seal 72 between the back panel 70 and at least one of the outer wrapper 20 and the inner liner 22. The sealing apparatus can be in the form of a crimping device, welding device, adhesive dispensing device, fastening device, combinations thereof, and other similar devices that can provide a seal 72 between the back panel 70 and the remainder of the insulated structure 12. It is contemplated that the sealing apparatus can provide a hermetic seal 72 between the back panel 70 and the insulated structure 12 at at least one of the outer wrapper 20 and inner liner 22 of the insulated structure 12.

Referring again to FIGS. 2-7, during operation of the delivery mechanism 30 and the pressing mechanism 40, the amount of the insulating medium 32 being disposed within the interior cavity 24 is monitored. The position of the back panel 70 relative to the insulated structure 12 is also monitored. In this manner, the amount of insulating medium 32 and the current volume 80 of the interior cavity 24 can be known values such that the density of the insulating medium 32 disposed within the interior cavity 24 can be calculated during operation of the dispensing mechanism and pressing mechanism 40. By calculating the current volume 80 of the interior cavity 24 and the mass and/or weight of the insulating medium 32 being disposed within the interior cavity 24, the insulating medium 32 can be compressed to define a target density 82 to be defined within the insulated structure 12. The target density 82 can be a value that is determined during the design of the appliance 10. The target density 82 can be determined based upon several factors that can include, but are not limited to, the size of the appliance 10, the thickness of the insulated structure 12, the type of insulating medium 32, the function of the appliance 10, combinations thereof, and other similar factors that can bear on the cost, dimensional parameters, and performance of the appliance 10.

Referring again to FIGS. 3 and 4, it is contemplated that the delivery mechanism 30 for the insulation delivery apparatus 18 can include an auger 90 that is disposed within the hopper 26. Operation of the auger 90 can cause a helical member to move the insulating medium 32 from the storage bin 28 and into the insulation conduit 34. As additional insulating medium 32 is compressed to achieve the target density 82, the auger 90 continues to operate in the delivery state 38 to provide additional insulating medium 32 to be disposed within the interior cavity 24 of the insulated structure 12. Once the appropriate amount of the insulating medium 32 is provided, the hopper 26 can be placed in the idle state 36, such that the auger 90 is slowed or stopped and no additional insulation, or substantially no additional insulation is provided into the interior cavity 24 of the insulated structure 12.

According to the various embodiments, the delivery mechanism 30 can include various alternate, or additional mechanisms, which mechanisms can include, but are not limited to, conveyors, blowers, suction devices, gravity fed mechanisms, and other similar delivery mechanisms 30 for disposing the insulating medium 32 within the interior cavity 24 of the insulated structure 12. It is also contemplated that combinations of these delivery mechanisms 30 can be used simultaneously, sequentially, or in a predetermined pattern in order to provide the appropriate amount of insulating medium 32 into the interior cavity 24 of the insulated structure 12 to achieve the target density 82.

Referring again to FIGS. 3-7, it is contemplated that in addition to the pressing mechanism 40 being included for compacting the insulating medium 32 to achieve the target density 82, a suction mechanism, including a vacuum pump 100 and a gas outlet valve 102 can be placed in communication with the interior cavity 24. In such an embodiment, the gas outlet valve 102 can be disposed in a portion of the insulated structure 12, in one or both of the outer wrapper 20 and the inner liner 22. It is contemplated that more than one gas outlet valve 102 can be disposed in the insulated structure 12 for expressing gas 104 from various portions of the interior cavity 24 of the insulated structure 12. The vacuum pump 100 can be used after the insulated structure 12 is hermetically sealed to express gas 104, such as air, from the interior cavity 24, where such an expression of gas 104 can cause an additional compression of the insulating medium 32. This additional compression of the insulating medium 32 through the expression of gas 104 can result in finite changes in the density of the insulating medium 32 to arrive at the target density 82 desired for the particular design of the appliance 10. In addition, the gas outlet valve 102 can be incorporated to work in conjunction with the delivery mechanism 30 to deliver the insulating medium 32 into the interior cavity 24. In this manner, gas 104 can be expressed and the expression of gas 104 also results in the insulating medium 32 being drawn toward the gas outlet valve 102. Accordingly, the expression of the gas 104 can result in the dispersion of the insulating medium 32 throughout the interior cavity 24. It is also contemplated that the gas outlet valve 102 can include a filter that allows for gas 104 to pass through the gas outlet valve 102, but substantially prevents the insulating medium 32 from passing therethrough.

Additional compression of the insulating medium 32 can also be achieved through use of a vibrating mechanism placed in communication with the interior cavity 24. Such a vibrating mechanism can be an external vibrating table positioned against the outer wrapper 20 and/or the inner liner 22. The vibrating mechanism can also be a portable vibrating wand that can be disposed within the interior cavity 24. In various embodiments, the vibrating mechanism can be part of the pressing mechanism 40, wherein the pressing mechanism 40 operates to compress and also vibrate the insulating medium 32 to further compact the insulating medium 32 in the interior cavity 24.

According to various embodiments, it is also contemplated that a gas inlet valve 110 can be attached to a gas injector 112 that can be used in conjunction with the gas outlet valve 102 attached to the vacuum pump 100. In such an embodiment, as the vacuum pump 100 expresses the gas 104 from the interior cavity 24 of the insulated structure 12, the gas injector 112 can inject an insulating gas 114 to replace the expressed gas 104 to provide additional insulating characteristics to the insulating medium 32. Such insulating gasses 114 can include, but are not limited to, argon, neon, carbon dioxide, xenon, combinations thereof, and other similar insulating gasses 114. According to the various embodiments, the locations and number of gas outlet valves 102, gas inlet valves 110 and other access apertures for injecting or expressing material from the interior cavity 24 can vary depending on the particular design and/or the desired performance of the insulation system of the appliance 10.

Referring again to FIGS. 3 and 4, according to various embodiments, it is contemplated that an additive delivery mechanism 120 can be included within the insulation delivery apparatus 18. The additive delivery mechanism 120 can be used to combine insulating material additives 122 into the insulating medium 32 to modify the insulating characteristics of the insulating medium 32. The additive delivery mechanism 120 can be positioned proximate the hopper 26 such that the additives 122 are combined with the insulating medium 32 as the insulating medium 32 is disposed within the storage bin 28 of the hopper 26. It is also contemplated that the additive delivery mechanism 120 can be defined with the delivery mechanism 30 itself, such that the delivery mechanism 30 also acts as a mixing apparatus for combining the one or more additives 122 with the insulating medium 32 such that both can be disposed within the interior cavity 24 of the insulated structure 12 simultaneously. It is further contemplated that the additive delivery mechanism 120 can include a separate mechanism that can be separately operated to provide the various additives 122 directly into the insulated structure 12 at a separate location from the insulating medium 32.

According to the various embodiments, the one or more additives 122 that can be included and combined with the insulating medium 32 can include, but are not limited to, insulating glass spheres, insulating gas 114, additional powder-based insulation, granular insulation, glass fibers, combinations thereof, and other similar insulating additives 122. These additives 122 can be combined with the insulating medium 32, where the insulating medium 32 can include various components that can include, but are not limited to, various forms of silica, aerogel, one or more opacifiers, glass fiber, and insulating glass spheres. It is contemplated that in the additives 122 and/or the insulating medium 32, the glass spheres can take the form of solid or hollow glass spheres and can be of varying sizes including microspheres, nanospheres, and spheres of different sizes. It is further contemplated that the microspheres can include a hollow cavity, or a hollow cavity that includes an at least partial vacuum defined therein.

Referring again to FIGS. 2-7, during operation of the insulation delivery apparatus 18, the inner liner 22 of the insulated structure 12 can define an internal compartment 14, such as a refrigerating or freezing compartment of a refrigerator, a heating cavity of an oven, a washing cavity of a dishwasher or laundry appliance, or other similar interior cavity 24 of various appliances and fixtures. In such an embodiment, the inner support 46 is configured to be in selective engagement with an outer surface 50 of the inner compartment. In this manner, the outer surface 50 of the inner compartment at least partially surrounds the inner support 46 such that the inner support 46 prevents lateral movement of at least the inner liner 22 of the insulated structure 12.

According to various embodiments, as exemplified in FIGS. 2-7, the inner liner 22 and outer wrapper 20 can be separate components that can be attached to one another while the inner liner 22 is disposed on the inner support 46. In such an embodiment, an edge 130 of the inner liner 22, or an edge 130 of the outer wrapper 20 can include a folded sealing member 132 that engages the other component of the insulated structure 12. By way of example, and not limitation, the outer wrapper 20 can include the folded sealing member 132 such that the folded sealing member 132 of the outer wrapper 20 engages the opposing surfaces of the edge 130 of the inner liner 22, such that the outer wrapper 20 can be engaged with and form a seal 72 with the inner liner 22 on both sides. As discussed above, a sealing apparatus can be included within the insulation delivery apparatus 18 for sealing the connection between the outer wrapper 20 and the inner liner 22 to provide a hermetic seal 72 between these components.

Referring now to FIGS. 4-6, it is contemplated that the engagement between the back panel 70 and the remainder of the insulated structure 12 can include a similar folded sealing member 132 of at least one of the edges 130 of the insulated structure 12 and/or the back panel 70. By way of example, and not limitation, the back panel 70 can include the folded sealing member 132 that extends over an edge 130 of the insulated structure 12 such that the folded sealing member 132 of the back panel 70 engages both sides of the edge 130 of the insulated structure 12 at either the outer wrapper 20 or the inner liner 22. In this manner, both sides of the folded sealing member 132 of the back panel 70 can be sealed against the insulated structure 12 to define the hermetic seal 72 between the back panel 70 and the insulated structure 12. As discussed above, the various sealing mechanisms that can define the hermetic seal 72 between the various components of the insulated structure 12 can include, but are not limited to, welds, adhesives, fasteners, crimping engagements, combinations thereof, and other similar sealing engagements.

It is contemplated that the various components of the insulated structure 12 can be made of various rigid materials that can include, but are not limited to, metals, plastics, combinations thereof, and other similar materials. Typically, the various components of the insulated structure 12 will be made of the same material, such as the inner liner 22, outer wrapper 20, and back panel 70, all being made of metal. It is also contemplated that these components can be made of different materials, although the methods for sealing different materials of the insulated structure 12 can require different types of sealing mechanisms and operations to define the hermetic seal 72 between the various components of the insulated structure 12.

After the outer wrapper 20 and inner liner 22 are sealed together, the operable outer support 52 can be selectively moved between a load position 140 and a fill position 142. The load position 140 can be defined by a position of the operable outer support 52 where the inner liner 22 and outer wrapper 20 can be disposed over the inner support 46 without interference from the operable outer support 52. As such, the load position 140 is defined by the operable outer support 52 being moved away from the inner support 46 such that the operable outer support 52 is free of engagement with the outer wrapper 20. Once the outer wrapper 20 and inner liner 22 are placed in position over the inner support 46 and sealed together, the operable outer support 52 can be moved to the fill position 142, wherein the operable outer support 52 is placed in engagement with the exterior surface 54 of the outer wrapper 20.

As discussed above, the inner support 46 and the operable outer support 52 buttress the inner liner 22 and outer wrapper 20 to prevent outward deflection of the insulated structure 12 during operation of the delivery mechanism 30 and pressing mechanism 40. As the delivery mechanism 30 and pressing mechanism 40 operates to increase the amount of insulating medium 32 and also increase the density of the insulating medium 32, these operations will tend to cause the insulated structure 12 to deflect outward as the density of the insulating medium 32 increases. The positioning of the inner support 46 and the operable outer support 52 serve to counteract this tendency to deflect such that the insulated structure 12 maintains its desired shape during operation of the insulation delivery apparatus 18.

Figure 7:
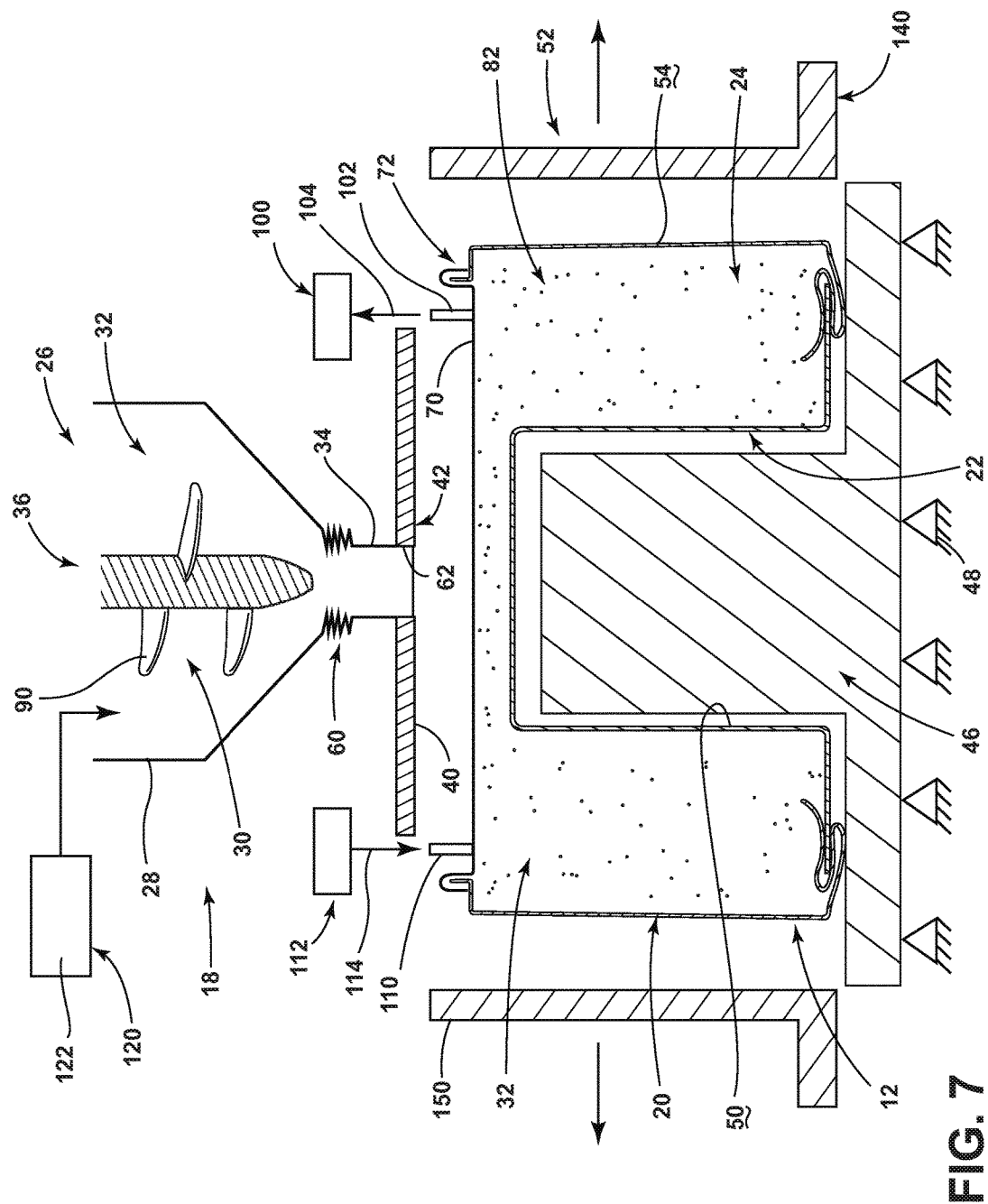
FIG. 7 is a cross-sectional view of an aspect of the insulation delivery apparatus after the vacuum insulated structure is formed.
Figure 8:
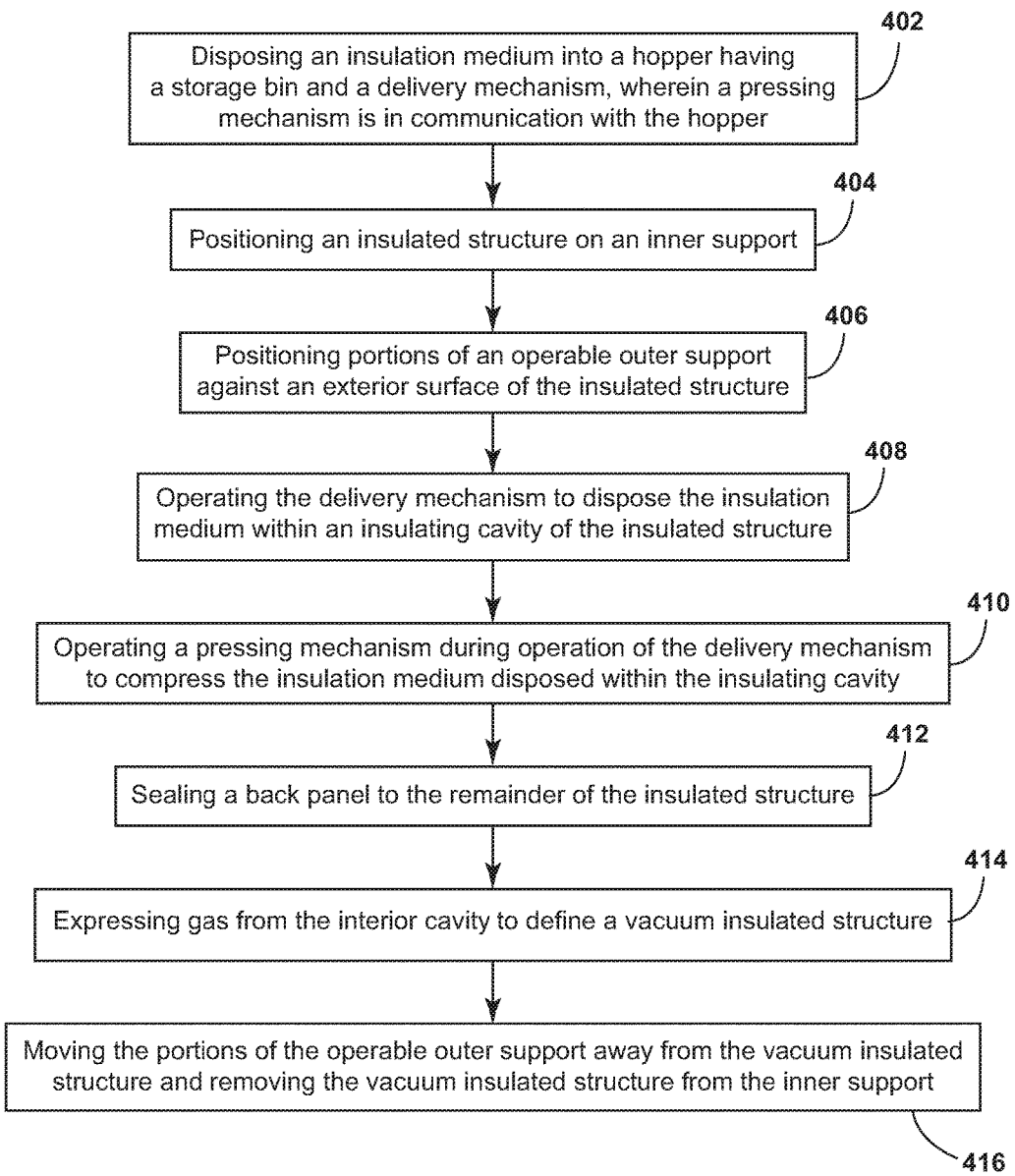
FIG. 8 is a schematic flow diagram illustrating an aspect of a method for forming an insulated structure for an appliance.
Figure 9:
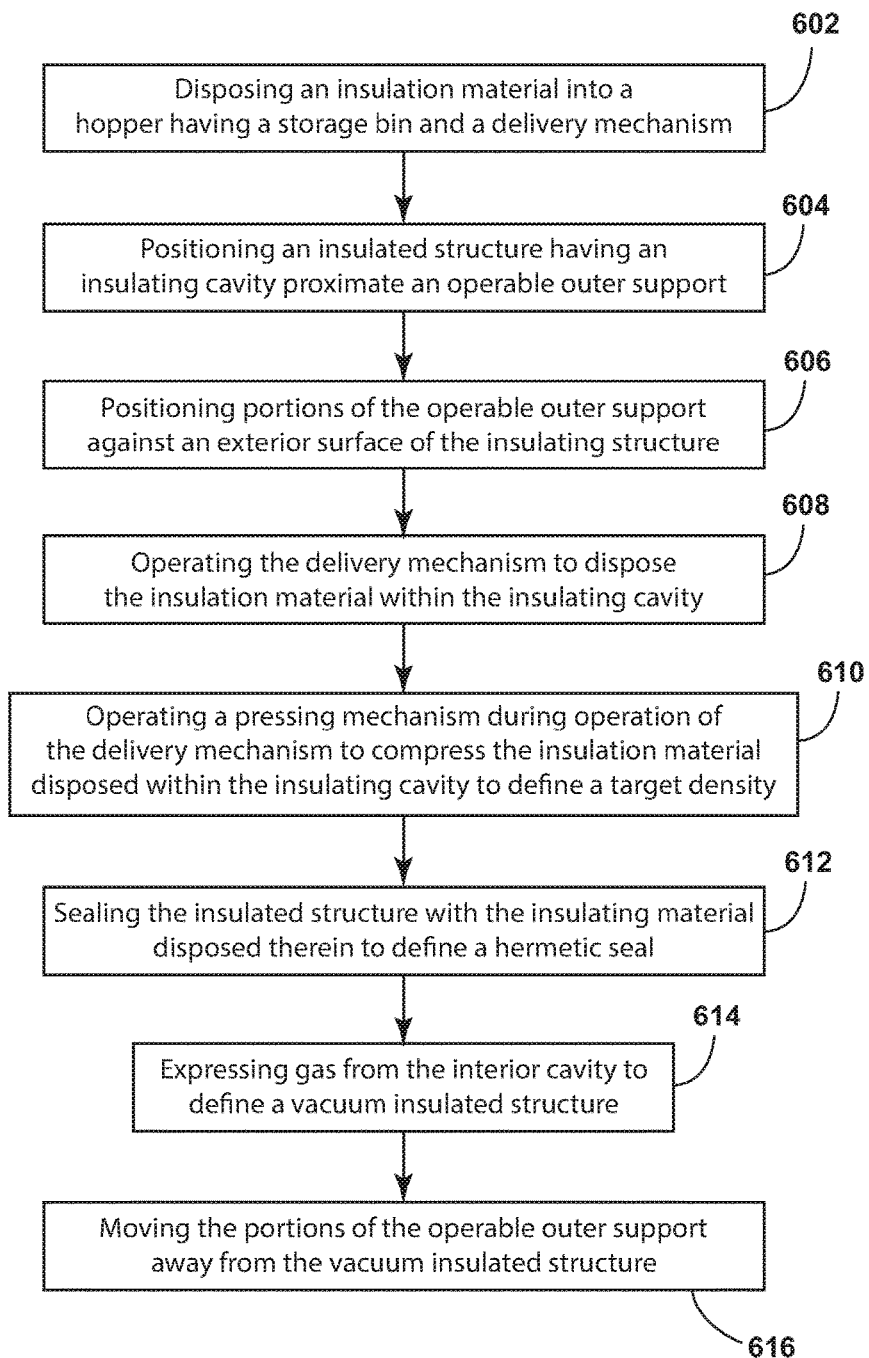
FIG. 9 is a schematic flow diagram illustrating an aspect of a method for forming a vacuum insulated structure for an appliance.

Referring now to FIG. 7, once the back panel 70 is sealed to the remainder of the insulated structure 12 and the target density 82 of the insulating medium 32 is achieved through operation of the delivery mechanism 30, pressing mechanism 40, and, where applicable, the vacuum pump 100 and the gas injector 112, the operable outer support 52 is moved back to the load position 140 such that the completed insulated structure 12 can be removed from the inner support 46, and components of another insulated structure 12 can be placed over the inner support 46 to begin the process again.

It is contemplated that for each insulated structure 12 placed upon the insulation delivery apparatus 18, different parameters can be set for each insulated structure 12. Accordingly, various components of the insulation delivery apparatus 18 can be modified to accommodate a variety of designs for various vacuum insulated structures 12. By way of example, and not limitation, the inner support 46 can be modified in size to accommodate different sizes of insulated structures 12. The amount of insulating medium 32 can also be modified and the amount of compressive force applied to the insulating medium 32 can be modified for each insulated structure 12 such that insulated structures 12 having various design parameters can be manufactured on the same insulation delivery apparatus 18. It is also contemplated that each insulation delivery apparatus 18 can be programmed to manufacture a single type of insulated structure 12 having a predetermined set of parameters that are achieved during each operation of the insulation delivery apparatus 18.

Referring now to FIGS. 2-8, having described various aspects of the insulation delivery apparatus 18 for forming the insulated structure 12 of the appliance 10, a method 400 is disclosed for an aspect of a method for forming a vacuum insulated structure 12. According to the method 400, an insulation material is disposed into a hopper 26 having a storage bin 28 and delivery mechanism 30 (step 402). It is contemplated that a pressing mechanism 40 can be placed in communication with the hopper 26, where the pressing mechanism 40 and delivery mechanism 30 can be operated either simultaneously, sequentially, or in varying operational parameters. According to the method 400, an insulated structure 12 is also positioned on an inner support 46 (step 404). According to the various embodiments, it is contemplated that the insulated structure 12 can include an inner liner 22 and an outer wrapper 20 that define an insulated interior cavity 24 defined therebetween. Where the insulated structure 12 includes an inner liner 22 and an outer wrapper 20, such structure can typically define a cabinet for an appliance 10. It is also contemplated, as will be described more fully below, that the insulated structure 12 can be a panel member used to form a vacuum insulated panel that can be placed within an appliance 10.

Referring again to FIGS. 3-8, once the insulated structure 12 is placed on the inner support 46, portions of an operable outer support 52 can be positioned against an exterior surface 54 of the insulated structure 12 (step 406). It is contemplated that the inner support 46 and the operable outer support 52 can serve to locate the insulated structure 12 such that the delivery mechanism 30 is in communication with the insulating interior cavity 24 of the insulated structure 12. Once the insulated structure 12 is located, the delivery mechanism 30 is operated to dispose the material of the insulating medium 32 within the insulation interior cavity 24 of the insulated structure 12 (step 408). The pressing mechanism 40 can also be operated during operation of the delivery mechanism 30 to compress the insulating medium 32 disposed within the insulated interior cavity 24 to define or substantially define the target density 82 of the insulating medium 32 (step 410). It is contemplated that the back panel 70 of the insulated structure 12 can be engaged with the pressing mechanism 40. It is also contemplated that the inner support 46 and the operable outer support 52 can substantially limit outward deflection of the outer wrapper 20 and inner liner 22 during operation of the pressing mechanism 40 and the delivery mechanism 30. Once the target density 82 or approximate target density 82 of the insulating medium 32 is achieved, the back panel 70 can be sealed to the remainder of the insulated structure 12 to define a hermetic seal 72 (step 412). Gas 104 can then be expressed from the interior cavity 24 to define a vacuum-type insulated structure 12 (step 414). After the vacuum-type insulated structure 12 is formed, portions of the operable outer support 52 can be moved away from the vacuum-type insulated structure 12 and the vacuum-type insulated structure 12 can be removed from the inner support 46 (step 416).

According the various embodiments, the operable outer support 52 can include support components 150 that can be moved in varying directions toward and away from the inner support 46 to define the load position 140 and the fill position 142. Such movements of the support components 150 of the operable outer support 52 can include lateral movements, vertical movements, rotating movements, combinations thereof, and other similar movements that can place the support components 150 of the operable outer support 52 proximate to and distal from the inner support 46, and, accordingly, into and out of engagement with the insulated structure 12.

Referring now to FIGS. 2-7 and 9, a method 600 defining another aspect of forming an insulated structure 12 is disclosed. According to the method 600, an insulating medium 32 is disposed into a hopper 26 having a storage bin 28 and delivery mechanism 30 (step 602). As discussed previously, a pressing mechanism 40 can be placed in communication with the hopper 26. It is contemplated that the pressing mechanism 40 can be directly attached to hopper 26 via the operable portion 60 of the insulation conduit 34. It is also contemplated that the pressing mechanism 40 can be a separate apparatus that operates in conjunction with the hopper 26, but is not directly attached thereto. In such an embodiment, it is contemplated that the pressing mechanism 40 can be disposed adjacent one of the insulated structure 12 and the delivery mechanism 30 can be disposed proximate another separate wall of the insulated structure 12. According to the method 600, the insulated structure 12 can be positioned proximate an operable outer support 52, wherein the insulated structure 12 includes an insulating interior cavity 24 (step 604). As discussed above, the insulated structure 12 can take the form of the structure of an appliance 10, or can take the form of a panel member that will be made into a vacuum insulated panel for installation, as a separate insulation unit, within the appliance 10. Portions of the operable outer support 52 can then be positioned against an exterior surface 54 of the insulated structure 12 (step 606). It is contemplated that the operable outer support 52 can locate the insulated structure 12 such that the delivery mechanism 30 is in communication with the insulating interior cavity 24. Once the insulated structure 12 is positioned, the delivery mechanism 30 can operate to dispose the insulating medium 32 within the insulating interior cavity 24 of the insulated structure 12 (step 608). The pressing mechanism 40 can then be operated to compress the material of the insulating medium 32 disposed within the insulating interior cavity 24 to define the target density 82 (step 610). It is contemplated that the pressing mechanism 40 can be operated during operation of the delivery mechanism 30 in a substantially simultaneous fashion, a sequential fashion, or according to a predetermined operational pattern of simultaneous/sequential or independent steps of the delivery mechanism 30 and the pressing mechanism 40. During operation of the delivery mechanism 30 and the pressing mechanism 40, the operable outer support 52 substantially limits outward deflection of the outer wrapper 20 during operation of the pressing mechanism 40. The insulated structure 12 can then be sealed with the insulating medium 32 disposed therein to define a hermetic seal 72 (step 612). When the insulated structure 12 is sealed, the insulating medium 32 can be at the target density 82, or at a density substantially similar to the target density 82 where further compressive or expansive operations may take place to place the insulating medium 32 at the target density 82. According to various embodiments, gas 104 can be expressed from the interior cavity 24 to define the vacuum-type insulated structure 12 (step 614). Once the vacuum-type insulated structure 12 is created, portions of the operable outer support 52 can be moved away from the vacuum-type insulated structure 12 (step 616). The vacuum-type insulated structure 12, in the form of a vacuum insulated cabinet or vacuum insulated panel, can be removed and components of another insulated structure 12 can be disposed proximate the operable outer support 52.

According to the various embodiments, the operation of the insulation delivery apparatus 18 can be used to fine-tune the density of the insulating medium 32 disposed within the insulated structure 12 to provide a substantially accurate density of the insulating medium 32 at a target density 82. As discussed herein, the various operations of the delivery mechanism 30, pressing mechanism 40, additive delivery mechanism 120, vacuum pump 100 and gas injector 112 can be used separately or in various combinations to achieve a substantially accurate target density 82 of the insulating medium 32 disposed within the insulated structure 12 of the appliance 10.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulation delivery apparatus for forming an insulated appliance structure, the insulation delivery apparatus comprising:
    an outer wrapper and an inner liner that cooperate to define an interior cavity;
    a storage bin in communication with a delivery mechanism, wherein the delivery mechanism selectively delivers an insulating medium from the storage bin, through an insulation conduit and into the interior cavity, wherein the delivery mechanism is operable between an idle state and a delivery state;
    a pressing mechanism coupled with the insulation conduit, wherein the pressing mechanism is in selective engagement with at least one of the outer wrapper and the inner liner, wherein the pressing mechanism is operable between a rest state and a compressing state, wherein a back panel is selectively engaged with the pressing mechanism, and wherein during the compressing state the pressing mechanism operates cooperatively with the back panel and an operable portion of the insulation conduit relative to the outer wrapper and the storage bin;
    an inner support in selective engagement with an outer surface of the inner liner; and
    an operable outer support in selective engagement with a portion of an exterior surface of the outer wrapper, wherein the inner support and the operable outer support provides structural support to the inner liner and the outer wrapper, respectively, when the pressing mechanism cooperates with the back panel to define the compressing state.

2. The insulation delivery apparatus of claim 1, wherein the operable portion of the insulation conduit is in communication with the pressing mechanism, and wherein the operable portion is at least vertically operable relative to the storage bin.

3. The insulation delivery apparatus of claim 2, wherein the back panel of the outer wrapper is selectively engaged with the operable portion of the insulation conduit.

4. The insulation delivery apparatus of claim 1, wherein the delivery mechanism includes an auger.

5. The insulation delivery apparatus of claim 1, wherein the inner liner defines an inner compartment, and wherein the inner support is in selective engagement with an outer surface of the inner compartment.

6. The insulation delivery apparatus of claim 1, wherein the operable outer support is selectively operable between a load position and a fill position, wherein the load position is defined by the operable outer support being free of engagement with the outer wrapper, and wherein the fill position is defined by the operable outer support being in engagement with the exterior surface of the outer wrapper.

7. The insulation delivery apparatus of claim 3, wherein a seal is defined between the back panel and one of the outer wrapper and the inner liner.

8. The insulation delivery apparatus of claim 1, further comprising:
    a vacuum pump in communication with the interior cavity via at least one gas outlet valve disposed in a portion of at least one of the inner liner and the outer wrapper.

9. The insulation delivery apparatus of claim 1, wherein the insulating medium includes at least one of silica, aerogel, opacifier, glass fiber and insulating glass spheres.

10. The insulation delivery apparatus of claim 1, further comprising:
an additive delivery mechanism, wherein additives are added to the insulating medium for deposition within the interior cavity, wherein the additives include at least one of insulating glass spheres and insulating gas.

11. A method for forming a vacuum insulated structure, the method comprising steps of:
disposing an insulation material into a hopper having a storage bin and a delivery mechanism, wherein a pressing mechanism is in communication with the hopper;
positioning an inner liner and an outer wrapper on an inner support, wherein the inner liner and the outer wrapper define an insulating cavity;
positioning portions of an operable outer support against an exterior surface of the outer wrapper, wherein the inner support locates the inner liner and the operable outer support locates the outer wrapper such that the delivery mechanism is in communication with the insulating cavity;
operating the delivery mechanism to dispose the insulation material within the insulating cavity;
operating the pressing mechanism during operation of the delivery mechanism to compress the insulation material disposed within the insulating cavity to define a target density, wherein a back panel of the outer wrapper is cooperatively and selectively engaged with the pressing mechanism, wherein the inner support and the operable outer support substantially limit outward deflection of the outer wrapper and inner liner during operation of the pressing mechanism;
sealing the back panel to at least one of the outer wrapper and the inner liner to define a seal;
expressing gas from the insulating cavity to define a vacuum insulated structure, wherein the expression of gas takes place while the inner liner and outer wrapper are engaged with the operable outer support and the inner support;
separating the pressing mechanism from engagement with the back panel; and
moving the portions of the operable outer support away from the vacuum insulated structure and removing the vacuum insulated structure from the inner support.

12. The method of claim 11, wherein the delivery mechanism is an auger.

13. The method of claim 11, wherein the hopper includes an insulation conduit through which the insulation material is delivered from the storage bin to the insulating cavity, and wherein the insulation conduit extends through a portion of the pressing mechanism to deliver the insulation material from the storage bin to the insulating cavity.

14. The method of claim 13, wherein the insulation conduit includes an operable portion engaged with the pressing mechanism, wherein the operable portion of the insulation conduit operates to substantially follow movement of the pressing mechanism.

15. The method of claim 11, further comprising the step of:
disposing at least one additive to the insulation material for deposition within the insulating cavity, wherein the at least one additive includes at least one of insulating glass spheres and insulating gas.

16. The method of claim 11, wherein the insulation material includes at least one of powder-based insulation, granular insulation, opacifier, glass fiber, insulated glass spheres and aerogel.

17. A method for forming a vacuum insulated structure, the method comprising steps of:
disposing an insulation material into a hopper having a storage bin and a delivery mechanism, wherein a pressing mechanism is in communication with the hopper;
positioning an inner liner and an outer wrapper proximate an operable outer support, wherein the inner liner and the outer wrapper define an insulating cavity therein;
positioning portions of the operable outer support against an exterior surface of the outer wrapper, wherein the operable outer support locates the inner liner and the outer wrapper such that the delivery mechanism is in communication with the insulating cavity;
operating the delivery mechanism to dispose the insulation material within the insulating cavity;
operating the pressing mechanism during operation of the delivery mechanism to compress the insulation material disposed within the insulating cavity to define a target density, wherein a back panel is selectively coupled to the pressing mechanism and directly engages the insulation material within the insulating cavity during operation of the pressing mechanism, and wherein the operable outer support substantially limits outward deflection of an outer wrapper and inner liner during operation of the pressing mechanism;
sealing the back panel to the outer wrapper;
sealing the inner liner and the outer wrapper together with the insulation material disposed therein to define an air-tight seal;
expressing gas from the insulating cavity to define a vacuum insulated structure;
separating the pressing mechanism from the back panel; and
moving the portions of the operable outer support away from the exterior surface of the outer wrapper for the vacuum insulated structure after completion of the expressing step.

18. The method of claim 17, wherein the vacuum insulated structure is a vacuum insulated panel.

19. The method of claim 17, wherein the hopper includes an insulation conduit through which the insulation material is delivered from the storage bin to the insulating cavity, and wherein the insulation conduit extends through a portion of the pressing mechanism to deliver the insulation material from the storage bin to the insulating cavity.

20. The method of claim 19, wherein the insulation conduit includes an operable portion engaged with the pressing mechanism, wherein the operable portion of the insulation conduit flexes to substantially follow movement of the pressing mechanism.

* * * * *